(12) United States Patent
Neuss

(10) Patent No.: US 10,559,791 B2
(45) Date of Patent: Feb. 11, 2020

(54) BATTERY MODULE

(71) Applicant: Wilhelm Neuss, Vaihingen an der Enz (DE)

(72) Inventor: Wilhelm Neuss, Vaihingen an der Enz (DE)

(*) Notice: Subject to any disclaimer, the term of this patent is extended or adjusted under 35 U.S.C. 154(b) by 142 days.

(21) Appl. No.: 15/548,427

(22) PCT Filed: Mar. 23, 2016

(86) PCT No.: PCT/EP2016/025028
§ 371 (c)(1),
(2) Date: Aug. 3, 2017

(87) PCT Pub. No.: WO2016/165834
PCT Pub. Date: Oct. 20, 2016

(65) Prior Publication Data
US 2018/0034020 A1  Feb. 1, 2018

(30) Foreign Application Priority Data

Apr. 16, 2015  (DE) .......................... 10 2015 004 762
Sep. 22, 2015  (DE) .......................... 20 2015 006 545

(51) Int. Cl.
H01M 2/10 (2006.01)
H01M 2/20 (2006.01)
(Continued)

(52) U.S. Cl.
CPC ......... H01M 2/1077 (2013.01); H01M 2/206 (2013.01); H01M 10/0525 (2013.01);
(Continued)

(58) Field of Classification Search
CPC ......... H01M 10/0422; H01M 10/0481; H01M 10/0525; H01M 10/123; H01M 10/643;
(Continued)

(56) References Cited

U.S. PATENT DOCUMENTS

2010/0310922 A1* 12/2010 Villarreal ............ H01M 2/1077
429/160
2011/0027622 A1* 2/2011 Hong .................. H01M 2/1055
429/7

(Continued)

FOREIGN PATENT DOCUMENTS

DE          51 50 51        12/1930
DE       10 2014 206646     10/2015
(Continued)

Primary Examiner — Carlos Barcena
(74) Attorney, Agent, or Firm — Varnum LLP

(57) ABSTRACT

A battery module has a plurality of round cells of identical dimensions, nominal charge capacity and voltage. They are grouped into a series of round cell stacks which are arranged one behind the other in a row and which all consist of an identical plurality of round cells which lie in each round cell stack axis-parallel to the stack row direction, adjacent and atop each other, in identical position in the stack row direction. There are contact plates arranged between adjacent round cell stacks, which electrically connect the round cells of each round cell stack in parallel to the poles thereof situated in the stack row direction. All round cells are arranged in such a way that all identical electrical poles face in the same direction and form a plurality of aligned round cell rows. The contact plates have protrusions of identical dimensions, each contacting a pole of a round cell but which are not integrally connected to the pole, such that all round cell poles are contacted via one of the protrusions. The contact plates are electrically conductive on the protrusions and in flat sections between the protrusions. A pole plate contacts the end-side contact plate on each of the two ends of the round cell stack row, and said pole plates are thicker-walled relative to the contact plates.

20 Claims, 10 Drawing Sheets

(51) Int. Cl.
*H01M 10/0525* (2010.01)
*H01M 10/04* (2006.01)
(52) U.S. Cl.
CPC .... *H01M 10/0481* (2013.01); *H01M 2220/20* (2013.01); *Y02E 60/122* (2013.01)
(58) Field of Classification Search
CPC ........... H01M 2220/20; H01M 2/1077; H01M 2/022; H01M 2/206; H01M 2/105
See application file for complete search history.

(56) References Cited

U.S. PATENT DOCUMENTS

| | | |
|---|---|---|
| 2011/0177373 A1 | 7/2011 | Pellenc |
| 2011/0223776 A1 | 9/2011 | Ferber, Jr. |
| 2011/0236728 A1* | 9/2011 | Uchida ................. H01M 2/204 429/7 |
| 2013/0082659 A1 | 4/2013 | Kano |
| 2013/0224532 A1 | 8/2013 | Bengtsson |
| 2016/0006006 A1 | 1/2016 | Motokawa |
| 2016/0172653 A1* | 6/2016 | Henderson .......... H01M 10/425 429/7 |
| 2018/0102519 A1* | 4/2018 | Tschiggfrei ......... H01M 2/1016 |

FOREIGN PATENT DOCUMENTS

| | | |
|---|---|---|
| EP | 2 157 634 A2 | 2/2010 |
| WO | WO 2011/096863 | 8/2011 |
| WO | WO2014/125807 A1 | 10/2014 |

* cited by examiner

BATTERY MODULE

CROSS REFERENCE TO RELATED APPLICATIONS

This application is a continuation application of international patent application PCT/EP2016/025028, filed Mar. 23, 2016, designating the United States and claiming priority to German application 10 2015 004 762.0, filed Apr. 16, 2015 and German application 20 2015 006 545.7, filed Sep. 22, 2015, and the entire content of these applications is incorporated herein by reference.

TECHNICAL FIELD

The invention relates to a battery module composed of a plurality of round cells which are connected in parallel and in series.

BACKGROUND

Since the advent of electromobility and the increased use of renewable energies, efforts are made increasingly to seek larger electricity storage solutions. According to the present state of the art, lithium-ion accumulators are most suitable for this because, in comparison with other batteries, they offer relatively high energy density, i.e. charge capacity, relating to the battery weight, but also with respect to the space required. However, there is a partial risk of explosion, so that safety aspects must be given great attention. In addition to this, there are still relatively high costs, at least with today's production possibilities.

One development line is directed to the development of large accumulator cells. However, the size and charge density of such individual battery modules is limited due to the danger of explosion which is to be kept in mind, so that usually several, relatively large cells, fitted with irons which show low susceptibility to explosions and also have a lower charge density, are interconnected with one another. One example of this is shown in German patent application DE 10 2013 203 102 A1, which shows a battery module formed from two battery cells. The two battery cells are connected in series in order to double the voltage supplied, or to halve the potential damage caused by a potential explosion. A further example of a high-voltage battery module, which is constructed from a stack of series-connected frame flat cells, i.e. flatly designed single large-battery cells, can be taken from DE 10 2010 013 034 A1, and a similar module from WO 2011/092039 A1. US patent application US 2006/0246348 A1 is based on an even more extensive modularization. Single prismatic cells are welded to cell strands at their poles. A plurality of individual cell strings accommodated side by side in corresponding holders form a battery module, with the cooling medium flowing around the individual cells, and a housing formed by the interconnected holders.

Due to the limitation of the potential damage caused by the explosion of a single cell and the cost advantages obtainable by mass production, a further developmental direction is directed to the use of relatively small round-wound individual cells arranged in parallel and/or in series in order to manufacture battery modules with the desired high capacity and output voltage. Owing to the relatively controllable risk associated with the failure of a single round cell, ions with relatively high charge densities can be used here, but they are also more susceptible to explosions and would therefore be unsuitable for large battery cells. In the case of small round cells however, they would only lead to outgassing in the case of an explosion, or they would only cause relatively manageable damage in the case of an explosion.

A pioneer who has identified the cost advantages associated with the mass production of round-wound single cells is Tesla. In the Tesla vehicles, battery modules are present in the underbody, which consist of a plurality of battery blocks arranged side by side in a distributed manner and are interconnected by means of intermediate switch lines, wherein each battery block has a layer of upright lithium-ion round cells, see e.g. European patent application EP 2 157 634 A2. Between the round cells of a battery block, cooling lines can be passed through, and the individual round cells are welded together in a relatively complex manner with a conductor wire, which in turn is welded to a conductor rail.

The conductor wire serves as a kind of current limiter in the manner of a fuse. In other words, it is intended to prevent an excessive power output/draw of a single cell and thus its failure or potential explosion. The cooling is intended to counteract the effect that, in the case of failure of individual cells or even in the case of inadequate power output of individual cells, other cells heat up strongly and soon fail or even gas out/explode in the permanent overload.

It is therefore attempted, through the single-wire contact, to achieve a current or voltage output which is as uniform as possible over all round cells in order to prevent the failure of individual cells, so as not only to obtain the capacity and output voltage of the battery module or of a single battery block of the module, but in order to not irreversibly damage the entire block or the entire module when the cells still operating are overloaded and overheated as a result of the failed cell.

Due to the standing arrangement of the round cells in the individual blocks and the arrangement of the battery blocks in a plane next to one another, as well as by the cooling lines in the blocks and the space required for the interconnection of the battery blocks and the individual wire contact of the round cells, the space requirement for the overall battery module also increases in combination with decreasing charge capacity relating to the space used for the module and the production costs involved.

US patent application US 2011/0177373 A1 discloses another battery module with a single layer of round cells in a standing arrangement.

Due to the above drawbacks, in the production of multiple round-cell battery modules, a lying arrangement of the round cells in battery blocks is often preferred, wherein the adjoining battery blocks form, in a series circuit and series arrangement, a strand of battery blocks which each comprise a layer of adjacent and stacked round cells which are switched in parallel at their two ends via respective contacts, wherein the battery blocks, which are formed from parallel-connected round cells, are then switched in series in the battery block strand in turn.

Such a battery module is disclosed, for example, in European patent specification EP 2 410 590 B1. A respective plurality of round cells of a block is attached to contact plates by spot welding and is thus connected in parallel. The contact plates are connected via lateral tabs to contact plates of the next level in the battery block strand. The round cells are furthermore accommodated in holders with semi-cylindrical receptacles, wherein the holders comprise through-bores in an axially parallel manner in relation to the round cells, through which tie rods are guided, which are clamped at both ends of the battery block strand and thus hold the battery module together. Further contact plates are inserted between the round cells of a block, which are joined together by spot welding to the contact plates to form a battery block, and the battery block adjoining the latter, in order to connect the battery blocks in series.

A similar battery module is shown in WO 2012/060754 A1 or US 2013/224532 A1 of the same patent family. Several battery packs, which in turn consist of a plurality of parallel-connected round cells, are arranged one behind the other in a battery block strand and are connected in series. The series connection of the battery blocks and the parallel connection of the round cells in each of the battery blocks is effected via perforated metal plates between the battery blocks, wherein nickel strips are pressed into the holes of the metal plates, which are spot-welded there with one pole of a round cell. The same can be gathered from US 2004/0197642 A1. The series connection of two modules consisting of three parallel-connected cylindrical cells is shown there. The parallel and series connection is effected here via contact plates which have square connecting surfaces assigned to the poles of the round cells. In the connecting surfaces, slots are provided, which serve for spot welding with the round cells.

US 2011/0223776 A1 discloses a releasable modular interconnect configured to form releasable electrical connections with a plurality of power cells. The electrical connections are established by pressing contacts with external force onto the poles of the cells. Output buses are positioned to output electricity to output terminals.

WO 2014/125807 A1 or US 2016/0006006 A1 of the same patent family disclose another battery module having a plurality of round cells, which round cells could be grouped into a series of two round cell stacks. The two round cell stacks are arranged in a row and have an equal plurality of round cells, each.

WO 2011/096863A1 shows a battery module with four rows of round cells, the round cells of which are each connected in parallel, wherein the round cell rows are electrically connected in series. Geometrically, the round cell rows are not arranged in series, but on both sides of a printed circuit board. The circuit board contains the battery management. On the printed circuit board, contact plates which protrude at right angles are mounted, which in turn have nickel strips with bent contact surfaces facing the poles of the round cells. Nickel is used in spite of poorer conductivity than copper for example, because, unlike copper, it can be welded with ease. A pure clamping arrangement for contacting the round cell poles instead of the welding with the nickel strips is considered less reliable with regard to the electrical and mechanical connection.

German patent application DE 10 2010 013 003 A1 also shows, in addition to a battery module composed of a stack of flat cells, a battery module which consists of battery packs, each of which is constructed from a layer of lithium-ion round cells, wherein the battery packs in the battery pack row thus formed are re-connected in series by interposed pole plates and the round cells of each battery pack are welded at their two pole ends to the pole plate there and are thus connected in parallel.

The welding of the round cells by laser welding with pole plates etc. at inaccessible locations between the round cells of the battery packs or by spot welding with pole plates using further contacting plates between the battery packs is complicated and also error-prone however.

SUMMARY

It is an objective of the present invention to provide a multiple round cell battery module which has high energy density relative to weight, volume and production costs and which takes account of the concerns which arise with regard to explosion risk and operational lifespan.

A generic battery module has a plurality of round cells with the same dimensions, the same nominal or target charge capacity and the same target voltage. The round cells are grouped into a series of round cell stacks. The round cell stacks are arranged one after the other in a row or in succession and all have an equal plurality of round cells. Therein, the round cells in each round cell stack are axis-parallel to the direction in which the round-cell stacks are arranged successively, i.e. arranged in the stack row direction, namely adjacent to each other and on top of each other in a position which is the same in the stacking direction. Round cells in the sense of the invention are round-wound batteries or accumulator cells, preferably lithium-ion cells with a cylindrical shape, the poles of which lie on the two flat end faces.

Contact plates are provided on the two ends of the round cell stack row located in and opposite to the stacking direction and between the adjoining round cell stacks, which electrically connect the round cells of each round cell stack at their poles located in and opposite to the stacking direction. End-side contact plates on both sides of each round-cell stack located in the stack row direction thus interconnect the round cells in the stack in parallel. Furthermore, all round cells with electrically rectified polarity are arranged in a strand, so as to form a plurality of aligned round cell rows or rows corresponding to the plurality of round cells per round cell stack. The round cells in a round cell row are thus arranged coaxially and are thereby electrically connected or switched in series via the contact plates, with simultaneous parallel switching.

In order to ensure a uniform current input or output in all round cell rows, two thick-walled pole plates are provided opposite the contact plate according to the invention, which pole plates rest on the two ends of the round cell stack row on the outside on the contact plate there. In order to electrically connect the battery module, connecting lines or the like can lead to the pole plates. The pole plates can also carry the power connections of the battery module.

The battery module according to the invention is further characterized in that the contact plates have protrusions which each contact one pole of a round cell by pressing on the pole, but which are not connected to the round cell pole in an integral manner or by material connection, i.e. they are therefore not welded.

According to a first aspect of the invention, the battery module according to the invention is further characterized in that the protrusions have identical dimensions and are provided on the contact plates at positions corresponding to the axes of the round cell rows. In this case, all round cell poles are contacted via one of the protrusions, wherein the contact plates are electrically conductive at the protrusions and in flat sections between the protrusions.

Similar to the single-wire contact, a defined supply of current or voltage (or draw during charging) for each individual cell which is identical in all cells can be ensured by contacting the poles of all the round-wound or round cells by means of the protrusions which can be produced relatively easily with identical dimensions, but with the simplest means and thus low production costs. The advantages resulting from the design of the "horizontal or lying battery stacking strand" with a view to the tightest packing of the round cells are also achieved, but without having to carry out a relatively complex and error-prone contacting of the round cells by means of a welded connection.

This is particularly advantageous because it has been shown that the welded joints cannot be produced with the uniformity necessary for a uniform current and voltage distribution to all round cells, which leads to the result that individual round cells are overloaded and overheat.

Corresponding countermeasures, for example, in battery management and in cooling can be omitted. They not only negatively impact the cost advantage of the multiple round cell battery, but also require space, and cooling in particular, as a result of which the achievable energy density of the battery module drops.

A uniform current and voltage distribution to all cells can be achieved in a simple manner by means of the contacting in accordance with the invention via the contact plate provided with protrusions, so that the service life of the battery module increases sharply compared to welded battery modules. As has been seen in thermography images, one can even make do without cooling or other expensive and/or space-consuming measures as a result of this even distribution of current and voltage, and thus also the temperature, which considerably reduces costs and space requirements.

It is assumed that the protrusions of the contact plates thereby effect a through-contact of the round cell rows, i.e. a series connection of the round cells arranged on the same axis, wherein the current seeks the path of least resistance or shortest path so that the main portion runs serially along the respective round cell row, whereas only potential equalization or balancing in the parallel direction takes place via the flat sections of the contact plates arranged between the round cell stacks if there are current or voltage differences between the currents flowing in series through the round cell rows. The main parallel distribution of the current flow to the round cell rows, however, takes place at the two ends of the round cell stack row forming the poles of the battery module, namely via the pole plates provided there. Advantageously, the contact plates are designed accordingly, so that the main portion of the current flows serially along the round cell rows, whereas only the potential equalization or balancing in the parallel direction takes place via the flat sections of the contact plates arranged between the round cell stacks.

Copper sheet, which has not only a good conductivity but also can be provided in a simple and cost-effective manner with the protrusions of the same dimensions, for example by embossing on a corresponding punch, has proven to be a particularly suitable material for the contact plates. Of course, the contact plate could, however, also be made from a different sheet metal, for example from a sheet made of a copper alloy. After the embossing of the nubs, the regions of the sheet between the nubs form the flat sections necessary for the parallel contact of the round cells in the round cell stacks.

Between two adjacent round cell stacks, two of these nubbed contact plates can be provided simply back-to-back with the nubs facing the two round cell stacks in order to contact the round cell rows in series. Preferably, between the two mutually adjoining contact plates, flat current collecting connections for measuring sensors or charging connections of a battery management can preferably be installed, preferably inserted and clamped there. At the two ends of the round cell stack row, on the other hand, one contact plate, which presses with its nubs on the outer poles of the round cells of the first and the last round cell stack, is sufficient.

According to a second aspect of the invention, the contact plates arranged between the round cell stacks at the positions corresponding to the axes of the round cell rows can also have protrusions of identical dimensions which each contact the two facing poles of two adjoining round cells of a round cell row by respectively pressing onto the two poles.

Specifically, the contact plates according to the second aspect of the invention could be formed as conductor plates or printed circuit boards. In this case, a contact plate formed as a printed circuit board or a pair of contact plates formed as printed circuit boards can be arranged between the neighbouring round cell stacks. A contact plate formed as a printed circuit board can also be provided at the ends of the round cell stack row located in the stack row direction.

In this case, the contact plates can have through-holes at the positions corresponding to the axes of the round cell rows. The protrusions can then be formed as sleeves or pins, which are inserted into the through-bores, preferably made of copper or another, highly conductive metallic material, or as soldering points placed there. On the respective contact plate, conductor tracks can then be printed on the respective contact plate for example, which conductor tracks are used to connect each of the protrusions of a contact plate with any other protrusion of the contact plate in parallel. For this purpose, a conductor track can lead for example to a conductor ring from each of the protrusions. It is also relevant here that the main current flow is guided in the serial direction, and in the parallel direction there is only a uniform distribution or compensation of any differences. Correspondingly, the resistance at the protrusions must be lower than in the parallel direction, which can already be produced by the shorter path, but also by larger conductor cross-sections.

These parallel connecting conductor tracks can then be formed in such a thin way, similar to single-wire contacting according to the prior art, that they act as current limiters, i.e. they burn through in the event of an overload, so that the corresponding cell is detached from the parallel grouping in the respective round cell stack. It would also be conceivable to respectively secure the parallel connections via an SMD fuse. The serial connections at the protrusions can be fused as required by an SMD fuse or by a defined connection (wire, sleeve, etc.) which permanently serially disconnects the round cell when a certain current value is exceeded. Thus, contact plates formed as printed circuit boards have the advantage of being able to receive conductor tracks designed as fuses and/or additional fuse elements which serve to disconnect a defective round cell from the rest in order to avoid a cascade effect.

According to a third aspect of the invention, the battery module according to the invention is further characterized in that the contact plates have, on their sides facing the plus poles of the round cells, protrusions of identical dimensions at positions corresponding to the axes of the round cell rows, which protrusions respectively contact a plus pole of a round cell by pressing against the respective plus pole, but are not connected to the round cell pole in an integral or materially bonded manner, i.e. they are therefore not welded. In this case, all round cell plus poles are contacted via one of the protrusions, wherein the contact plates are electrically conductive at the protrusions and in flat sections between the protrusions. On the other hand, the battery module is characterized according to the third aspect of the invention in that the contact plates also have protrusions of identical dimensions on their sides facing the minus poles of the round cells, but for each minus pole have a plurality of protrusions, in particular three, which contact the respective minus pole, in that they press onto the minus pole, but are not integrally connected to the minus pole, so that all the round cell minus poles are contacted via one of the plurality of protrusions. In order to also enable contact with the round cell poles adjacent to one of the two end contact plates or end-side contact plates via one of the protrusions or one of the plurality of protrusions, it is advantageous if the terminal contact plate on the plus pole side has the same protrusions as the contact plates on the plus pole side thereof, and if the terminal contact plate on the minus pole side has the same plurality of protrusions as the contact plates on the minus pole side thereof.

The protrusions allow the round cells in the battery module to be mechanically fixed and electrically contacted by clamping force. It would also be possible within the scope of the invention to contact the minus poles with a central protrusion and the plus poles each with a plurality of protrusions arranged concentrically thereto. Since the minus poles of the round cell are known to be particularly soft in their centre, eccentric contacting of the minus poles ensures effective protection of the round cells from damage, while simultaneously providing good fixing of the round cells as a result of the minus pole-side clamping at several points, advantageously at three points ("tripod principle"), which in this sense are more preferably arranged concentrically and uniformly about the circumference around the respective round cell row axis. As an alternative to the preferably point-shaped contacting with a plurality of protrusions per contacting one of the minus poles, protrusions encircling each other annularly are also conceivable within the scope of the invention.

The advantages with regard to the reliably identical, defined current or voltage supply (or draw during charging) per single cell and uniform current or voltage distribution on all round cells at low production costs, compact design at high energy densities, and the long service life despite or simply because of the simple construction without costly cooling and battery management measures, have already been mentioned in connection with the first aspect of the invention and also apply in this case, as also the effect with regard to the balancing and distribution of current and voltage as already explained in the context of the first aspect of the invention.

Here too, copper sheet has proven to be a particularly suitable material for the contact plates, which sheet can be provided with the protrusions in a simple and cost-effective manner, for example by impressing on a corresponding punch. Of course, the contact plates could, however, also be made of a different sheet metal, e.g. a sheet made of a copper alloy. After the embossing of the nubs, the regions of the sheet between the nubs form the flat sections necessary for the parallel contact of the round cells in the round cell stacks.

Due to the eccentric arrangement of the minus-pole contacting protrusions, it is managed to emboss the contacting protrusions for both the minus poles of a round-cell stack as well as for the plus poles of the following round-cell stack on a single contact plate, e.g. from copper sheet, without leading to any disadvantage with regard to the electrical contacting. Mechanically, the sheet of the contact plates nubbed in both directions acts like a spring. Thus, it is sufficient to interpose only one contact plate, which is made of copper sheet for example, with protrusions which are embossed on both sides, between two adjacent round cell stacks, so that corresponding material and weight savings occur. At the two ends of the round cell stack row, on the other hand, one end contact plate pressing with its nubs on the outer poles of the round cells of the first and the last round cell stack is sufficient, wherein identical nubbed end contact plates could are also conceivable here.

Due to the spring action of the contact plates, the battery module remains securely and permanently contacted even during movement, thereby simultaneously minimizing cell damage.

However, between two adjacent round cell stacks, two nubbed contact plates could also be provided back-to-back with the nubs facing the two round cell stacks in order to contact the round cell rows through in series. Preferably, flat current collecting terminals for measuring sensors or charging connections of a battery management system can be attached, preferably between the two adjacent contact plates, preferably inserted and clamped there.

The thickness of the pole plates, which is greater than the thickness of the contact plates, is of decisive importance according to all aspects of the invention, wherein the pole plates are preferably made of copper, but also other metals such as copper alloys as well as aluminium could be considered. In order to be able to extract the maximum current intensity from the cell unit, the current-collecting pole plates must be sufficiently dimensioned in order to avoid forming a bottleneck in the circuit. Tests have yielded advantageous thicknesses of copper pole plates from 3 mm upwards, preferably 4 mm to 7 mm, for example 5 mm. Tests have shown that the maximum temperature difference in the battery module of 2 degrees Celsius is not exceeded. Here the cells were discharged at the maximum rated load up to the end-point voltage. The disadvantage of the additional weight due to the thick current-collecting plates is compensated by the low transition resistances of the nubbed contact plates in the respect that the nominal capacity can also be collected under full load as a result of the uniform temperatures.

In contrast to known battery modules, which have an undefined current flow and therefore problems with the heat removal at higher currents due to the absence of appropriately dimensioned pole plate, in particular in the case of permanent discharge in the rated current range of the individual cell, and therefore need to be operated with lower current intensity or with more cell spacing and passive or active cooling, the balanced temperatures in the battery module proposed here allow the most dense packing of the round cells for operation with the rated current of the individual cells.

In the round cell stacks of the battery module, the round cells are therefore advantageously arranged in the most densely packed manner resting on one another:

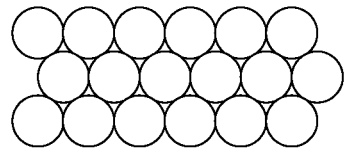

The battery module is particularly suitable for larger cell assemblies and therefore advantageously has three or more round cell stacks each having ten or more round cells.

In order to hold the round cells in the round cell stack row forming the battery module, clamping means are advantageously provided, which exert a clamping force acting in the stacking direction on the round cell stack row. As a result, the round cells are pressed with their poles against the protrusions of the contact plates and are thus securely contacted and held in position. According to an advantageous further development, clamping means pressing on the two end faces of the round cell stack row are provided, so that no tie rods or the like are required which need space in the area of the round cell stack row. However, individual round cell rows can also be replaced by tie rods, so as to reduce the overall size of the entire battery module. In this case, care must be taken that the tie rods consist of non-conductive material or, in particular, of sufficiently insulated material at the pull points. CRP or GRP thread bars have proved suitable, also because of the low weight.

Alternatively or in addition to the clamping means, a receptacle or holder could be provided for fixing the individual parts of the battery module, in which the round cells grouped with the round cell stacks are arranged or held in order to fix the round cells as well as the contact plates in their position.

According to the third aspect of the invention, the contact plates which are in the form of spring dimple plates also increase the clamping force in comparison with the contact plates of the first aspect of the invention, so that the individual cells are prevented from twisting and contact safety also occurs when the entire block is warped. In addition, the length of the round cell stack row can be increased to 10-12 round cell stacks by the increased clamping force without cell damage.

Preferably, the receptacle has a preferably flat, closed or apertured base and two flanks which are fixed thereto or integral therewith and extend along the base in the stacking direction as longitudinal walls or longitudinal wall sections. If the inner distance of the two flanks corresponds to a multiple of the diameter of a round cell, namely the number of round cells which lie in the lowermost layer on the flat bottom in the round cell stacks, it is easy to achieve positional fixing the round cells, in particular in cooperation with the clamping means which press the two ends of the round cell stack row.

Further layers of round cells can rest directly on the respective underlying layer of round cells, so that the round cells of one layer are arranged offset to the side of the round cell of the directly underlying layer by a half diameter.

In this way, not only a further positional fixing of the round cells is achieved but also a simple fitting of the receptacle with the round cells, which can be filled almost as bulk material and automatically align themselves in the desired position, wherein the lowest layer and every second of the layers lying thereon are supported laterally on the flanks.

The clamping means, e.g. the tie rods which are longitudinally passed through the battery pack and through corresponding bores in the pole plates, can then act on both pole plates, e.g. via insulating plates which are applied externally on the pole plates. As a result, the clamping force is distributed over the entire cross-section of the round cell stack.

If, however, the two pole plates are movable against the receptacle in the stack row direction, but they can be secured to the receptacle via clamping means pressing on the pole plates from the outside, for example by respective pressure screws screwed into threaded holes of an outer transverse wall of the receptacle and pressed onto the pole plate or an insulation placed externally on the pole plate, then a further side wall is provided next to the flanks in order to serve as a stop when the receptacle is fitted with the round cells of a round cell stack adjoining one of the pole plates. The fitting of the receptacle with the round cells is thus further simplified: The contact plate, which is interposed between the pole plate and the first round cell stack, can be simply laid loosely on the pole plate before filling the round cell of the first round cell stack. After the round cells of the first round cell stack have been filled, the two contact plates, which are interposed between the first and the second round cell stack, can likewise be loosely inserted so that a stop for filling the round cells of the second round cell stack is available there again, etc.

It would also be conceivable to arrange one of the pole plates in a stationary manner in the receptacle and to allow the clamping means to act only on the other pole plate which is displaceable in relation to the receptacle in the stack row direction. The contact plates interposed between the round cell stack can be inserted completely loosely into the receptacle, which allows a particularly simple design of the receptacle with flat bottom and side walls. However, it would also be conceivable to provide the receptacle at the corresponding positions with slots or the like into which the contact plates are inserted during assembly so that a certain coarse positional fixing of the contact plate is achieved in order to thus provide individual compartments for fitting with the round cells for the round cell stack, but the clamping of the finished round cell stack row is still possible.

It is also advantageous to provide a cover which fits the receptacle and which can be removed therefrom from fitting the receptacle and forms with the receptacle a completely closed housing or at least at least one housing closed on the upper and lower sides, from which only the necessary electrical connection lines are led out or which is provided with respective terminals. As a result, all the current-carrying parts of the battery module can be encapsulated in the housing in an insulated manner, and the round cells can also be fixed on the cover side so that a tipping movement of the battery module or an overhead installation is also uncritical insofar as the receptacle or cover has respective transverse walls on the end faces. On the transverse walls, the clamping means which press onto the pole plate could then be supported. It would also be conceivable to integrally form one of the pole plates with a transverse wall, e.g. with an insulating coating on the outside, and with the clamping means only to press the other pole plate, which is movable against the building, wherein the clamping means are then able to support the other transverse wall.

It would also be conceivable to use the receptacle only for mounting purposes. This means that the receptacle is removed again after the correct arrangement of the round cells in the receptacle and the contact plates and a subsequent clamping of the battery module.

BRIEF DESCRIPTION OF THE DRAWINGS

The invention is explained in closer detail with reference to the appended drawings, wherein.

DESCRIPTION OF EXEMPLARY EMBODIMENTS

Figure 1:
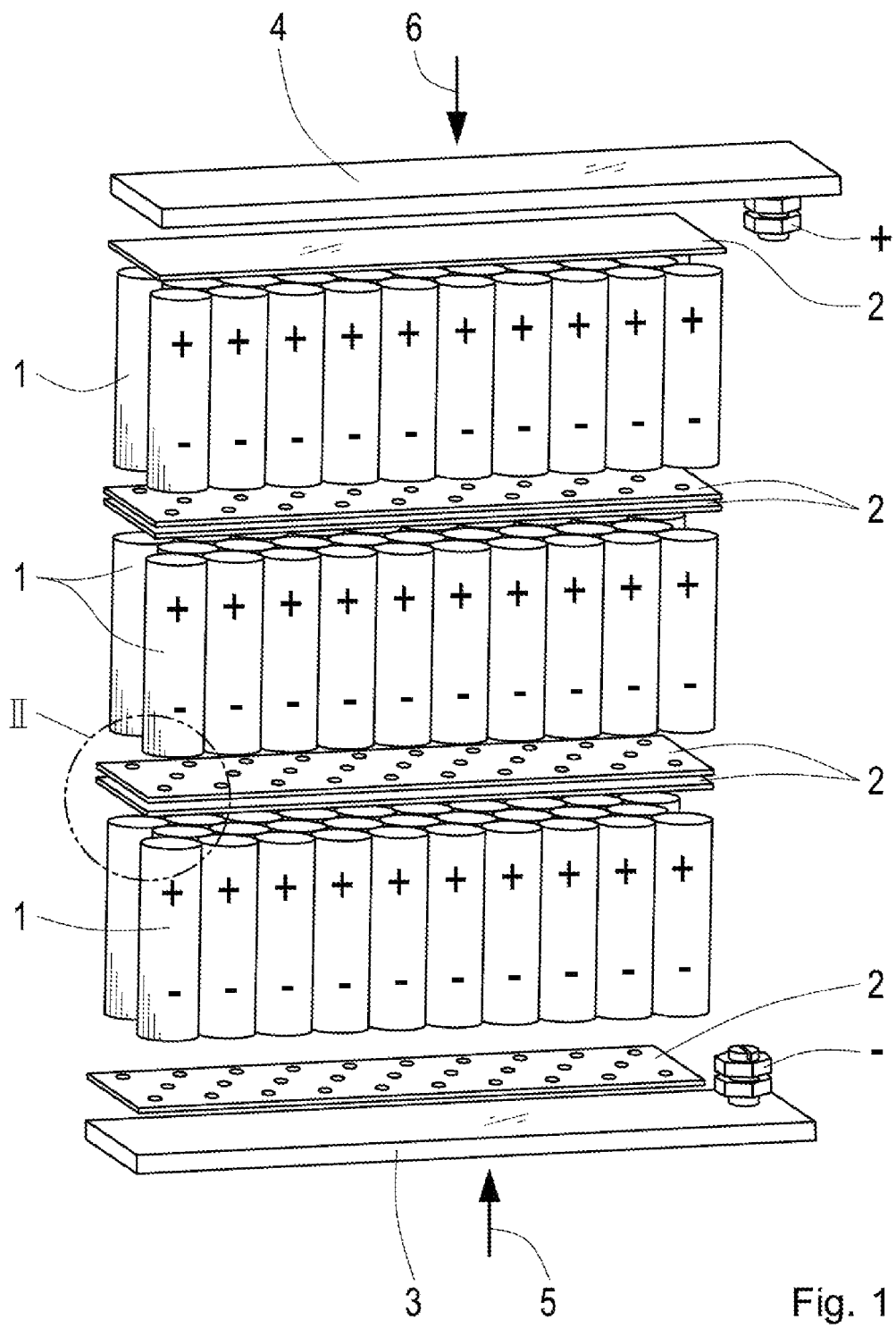
FIG. 1 shows an exploded view of a battery module according to an embodiment of the invention, but without housing and with merely indicated clamping means.

The battery module shown in FIG. 1 has 87 lithium-ion round cells, all of which are grouped with the same rectified polarity to form three round cell stacks of 29 round cells and are provided with the reference numerals 1. The round cell stacks are in turn arranged in series adjacent to each other, wherein two contact plates 2 are respectively interposed between two mutually adjacent round cell stacks. One further contact plate 2, respectively, is located at the two face ends of the round cell stack row, as well as a respective pole plate 3, 4 on top thereof on the outside, on which the connection terminals +, −, are provided for tapping the current. The clamping elements 5, 6, which are indicated only schematically in FIG. 1 by an arrow, act on the pole plates 3, 4 in order to clamp the battery module together.

Figure 2:
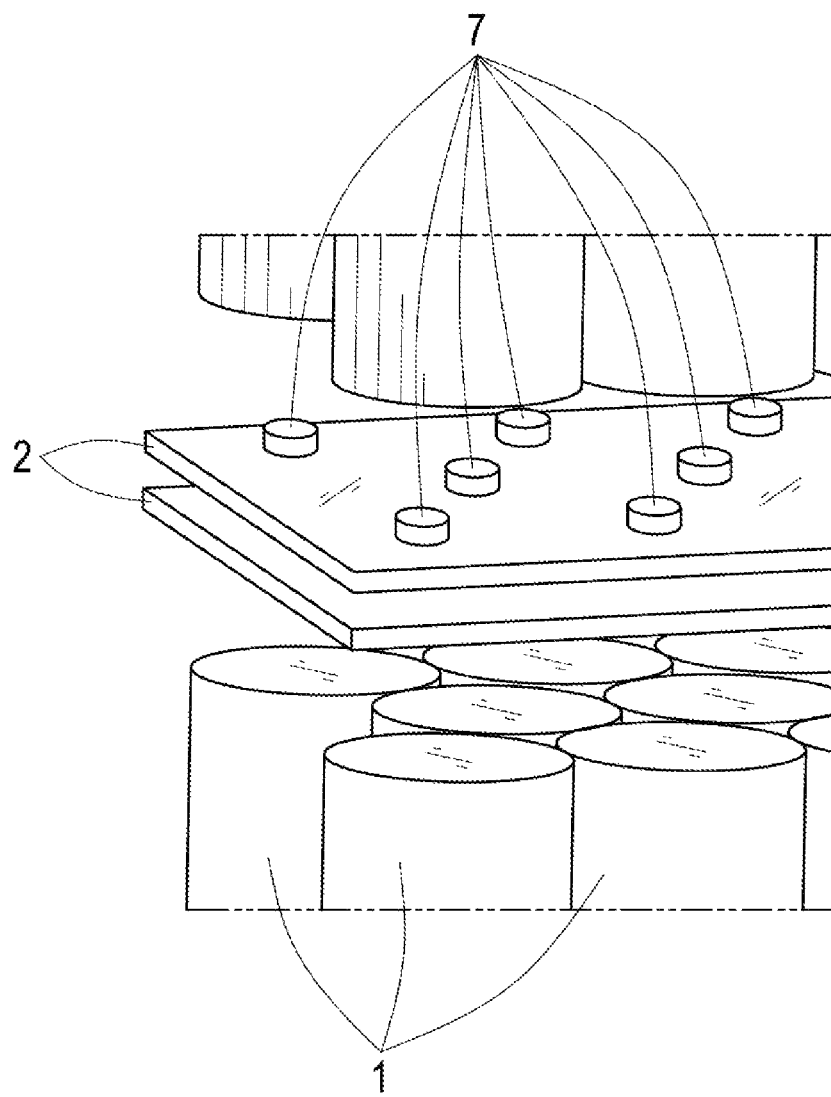
FIG. 2 shows a detail II in FIG. 1.

The round cells 1 have a cylindrical shape, wherein the two flat end faces serve as poles, and are arranged in three layers per round cell stack, wherein the round cells of the middle layer are offset by a half the diameter so that the densest possible packing of the round cells 1 is obtained in the respective round cell stack. On their sides facing the poles of the round cells 1, the contact plates 2 are provided with protrusions 7, which can be seen in particular in FIG. 2. Therein, the protrusions 7 are located on axes which each extend through one of the round cells 1 per stack and, in the assembled state, each press on a round cell pole so that the three coaxial round cells are contacted through to form a series connection, whereas the round cells of each round cell stack are connected in parallel via the protrusions and the flat portions of the contact plates 2 disposed between the protrusions.

Figure 3:
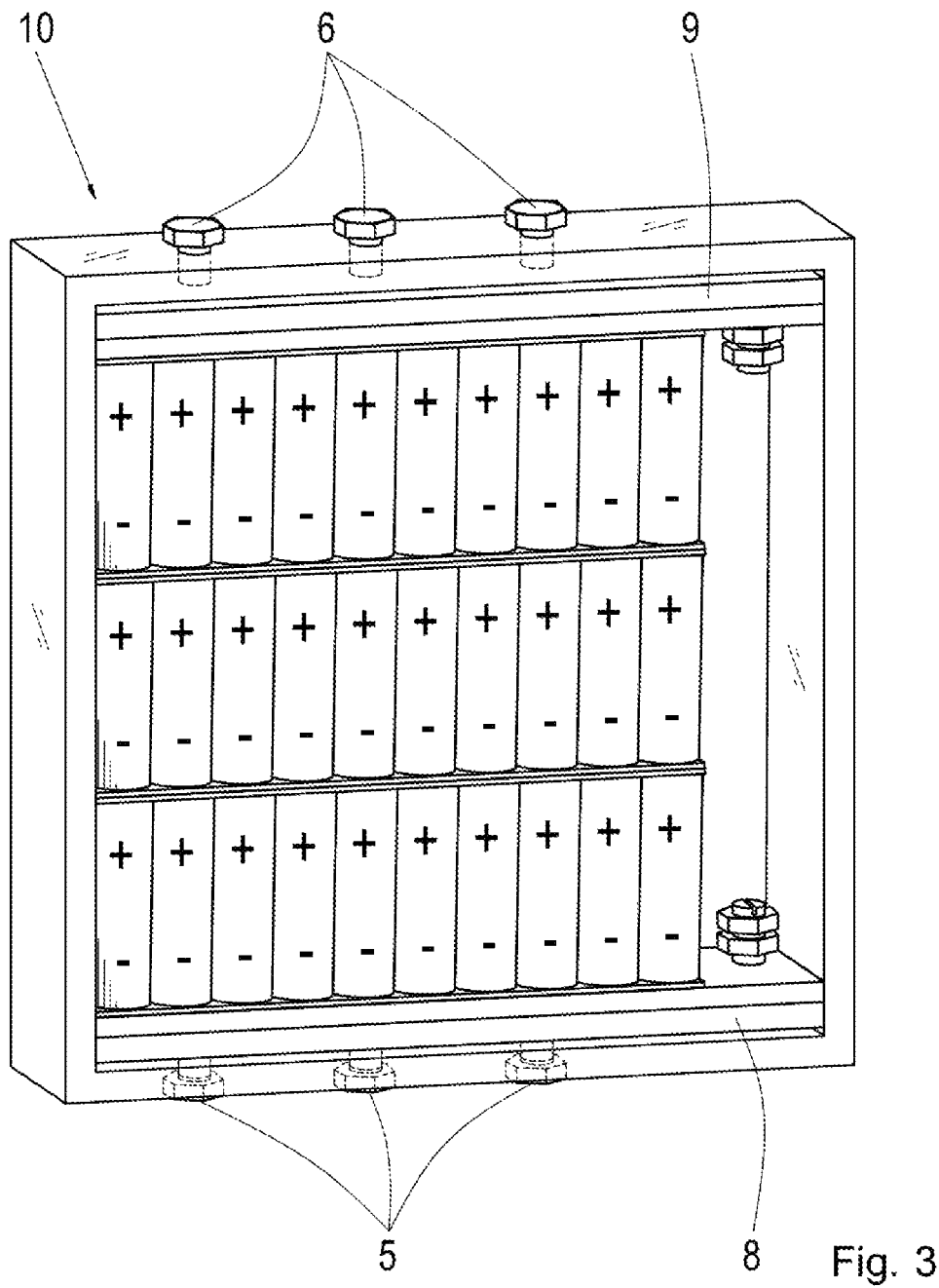
FIG. 3 shows a view of the embodiment of the invention shown in FIGS. 1 and 2, having a receptacle of a housing and clamping means pressing from the outside on the pole plates.

In the exploded view of FIG. 1, only the round cell stack row, which consists of the round cells 1, the contact plates 2 and the pole plates 3, 4, is shown of the battery module. FIG. 3 shows the entire battery module with the round cell stack row received in a receptacle 10 and with clamping means 5, 6 designed as pressure screws 5, 6. The receptacle has a base, as well as longitudinal and transverse walls. The pressure screws 5, 6 are screwed into threaded holes in the transverse walls and press on insulating plates 8, 9, which lie on the outside of the pole plates 3, 4.

Figure 4:
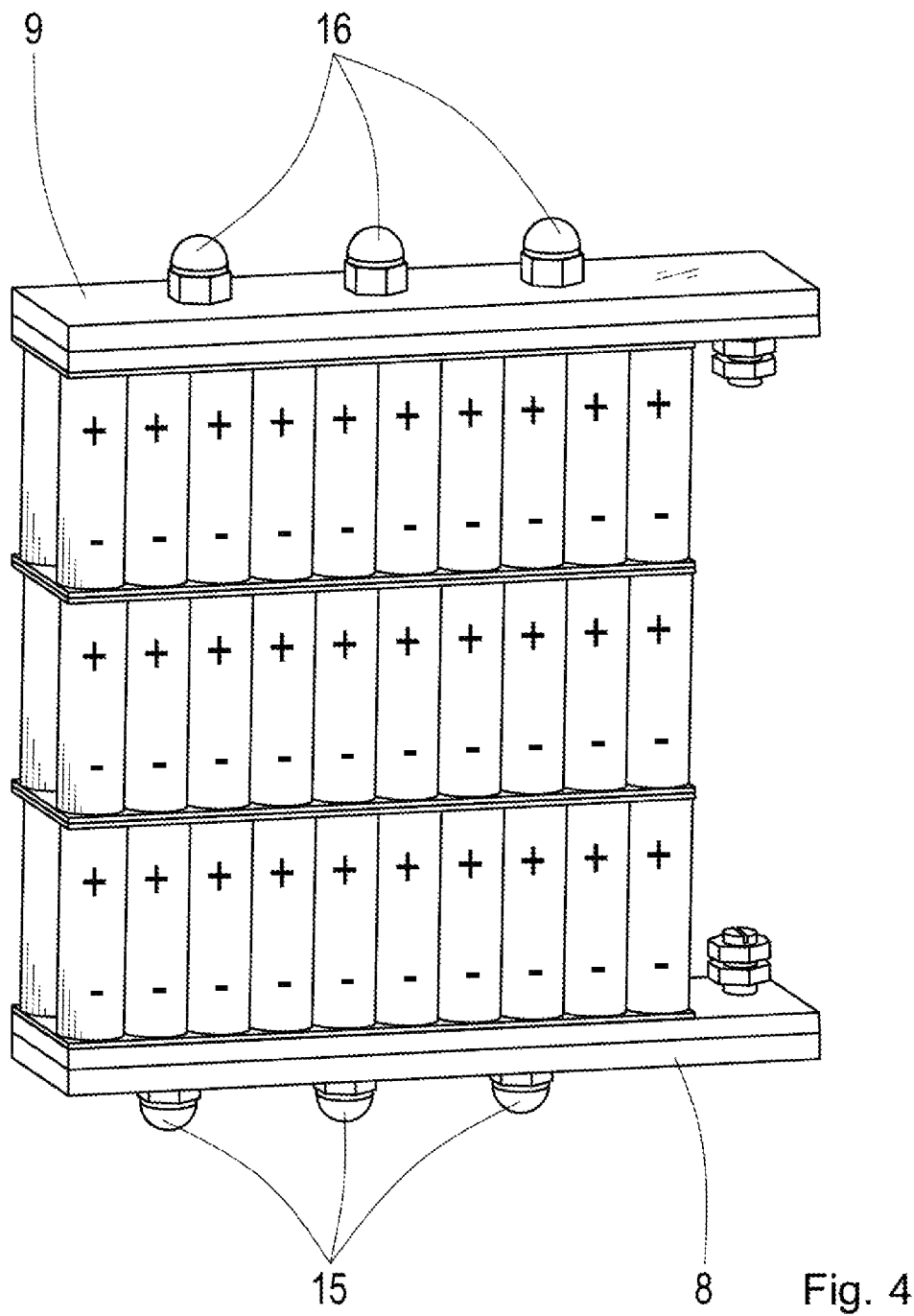
FIG. 4 shows a further embodiment of the invention, having clamping means with tie rods guided through the battery module.

FIG. 4 shows a battery module according to an alternative embodiment. There, three round cell rows have been omitted in the middle position of the round cell stack from the battery module shown in the previous figures. Instead of this, threaded bolts or tie rods, which together with nuts 15, 16 serve as clamping means for clamping the round cell stack row, are guided through. The nuts press onto insulating plates 8, 9, which bear against the pole plates 3, 4 on the outside.

Figure 5:
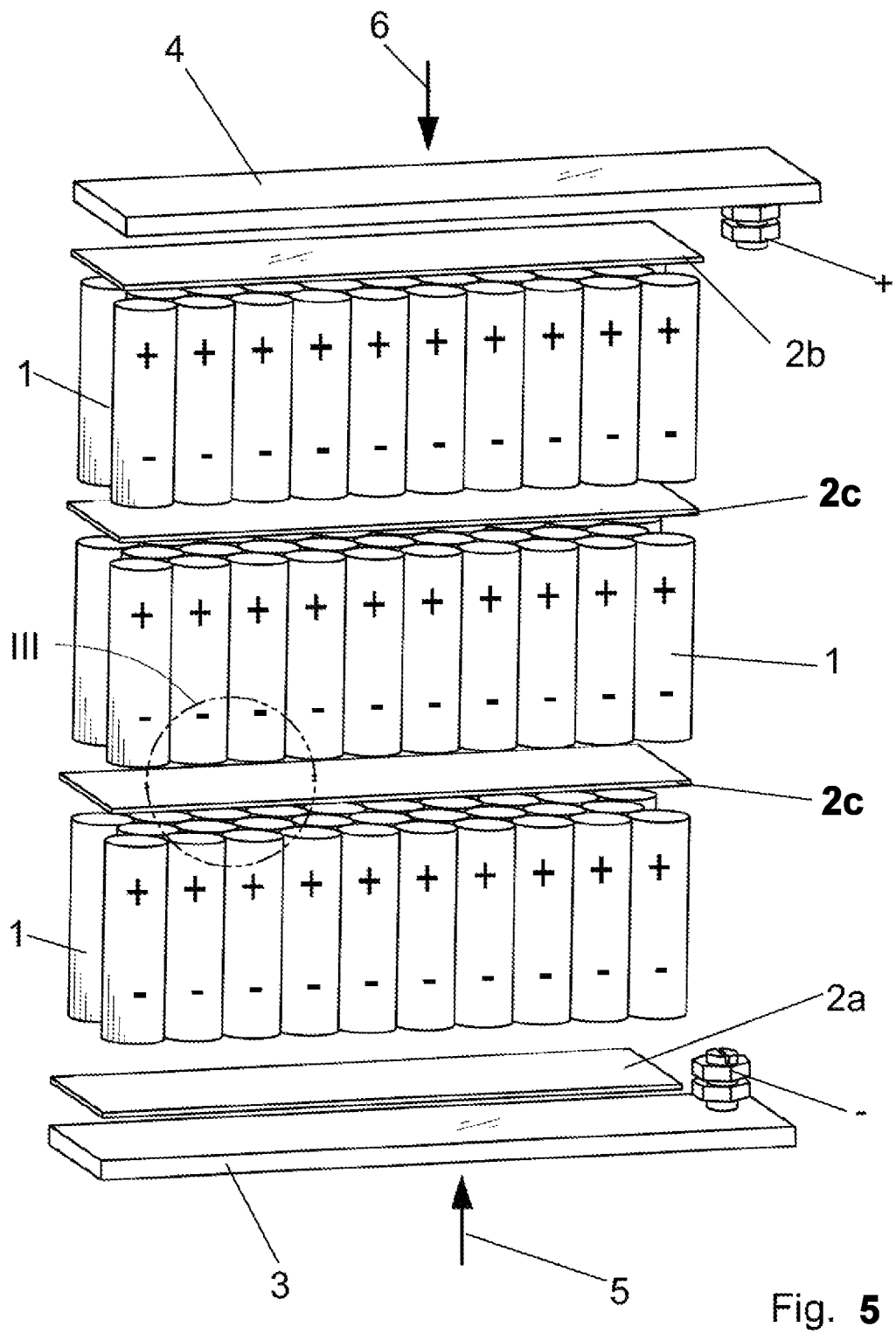
FIG. 5 shows an exploded view of a battery module according to a further embodiment of the invention, but without housing and with merely indicated clamping means.

The battery module shown in FIG. 5 has lithium-ion round cells in a form and arrangement corresponding to FIG. 1. The round cell stacks are, in turn, arranged in series with one another, wherein only one contact plate 2c is interposed between two adjacent round cell stacks. An end contact plate 2a, 2b is respectively located at each end face of the round cell stack row, as well as a pole plate 3, 4 on top on the outside, on which the connection terminals +, −, are provided for tapping the current. Clamping means 5, 6, which are indicated only schematically by an arrow in FIG. 5, act on the pole plates 3, 4 in order to clamp the battery module together.

Figure 6:
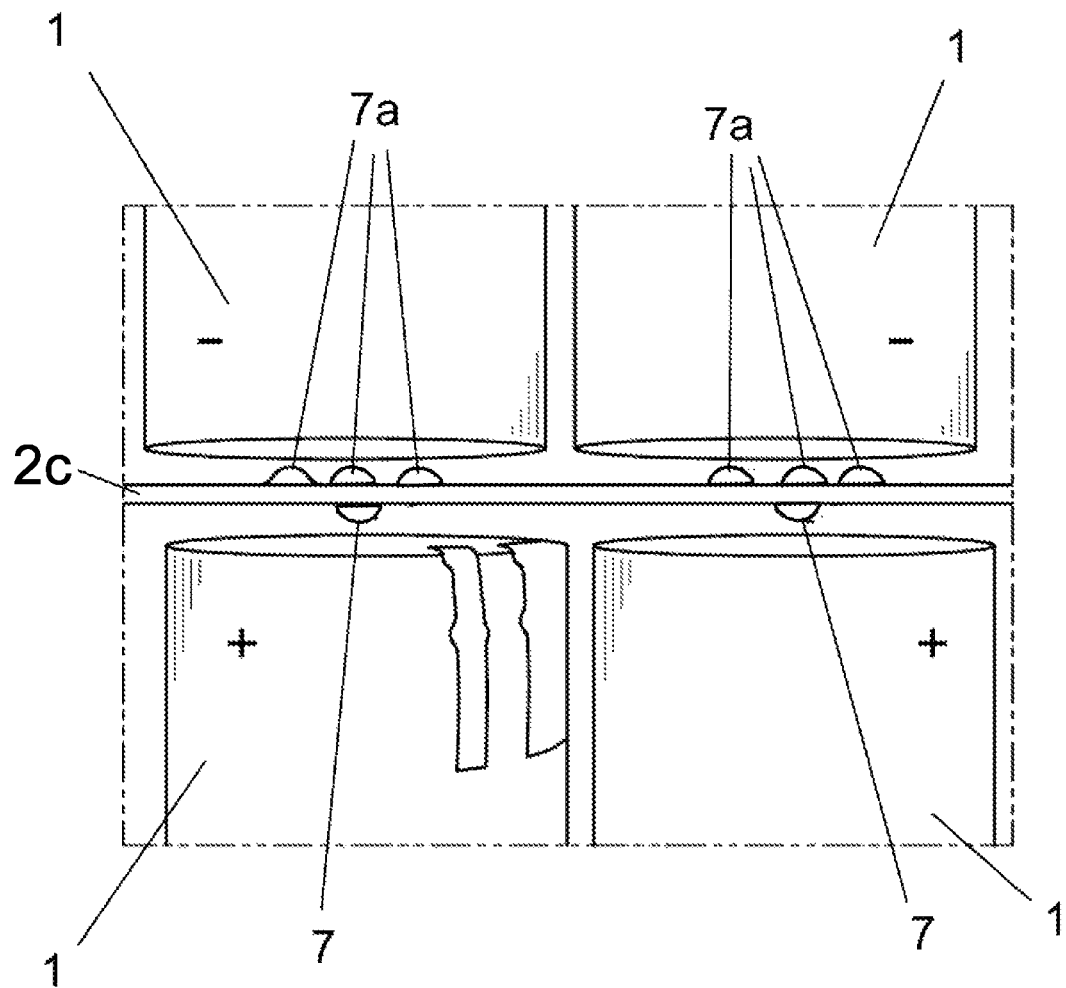
FIG. 6 shows a detail II in FIG. 1.

The contact plates 2c and the end contact plate 2b which is at the top in FIG. 5 are provided with protrusions 7 on their sides facing the plus poles of the round cells 1, which protrusions 7 have not been shown in FIG. 5 for the sake of clarity, but can be seen in particular in FIG. 6. The protrusions 7 are in each case located on the axes extending through one of the round cells 1 per stack and, in the assembled state, each press on a round cell plus pole so that the round cell plus poles of each round cell stack extend over the protrusions 7 and the flat sections of the contact plates 2 disposed between the protrusions and the end contact plate 2b are connected in parallel.

At their sides facing the minus poles of the round cells 1, the contact plates 2c and the end contact plate 2a which is at the bottom in FIG. 5, on the other hand, are not each provided with a central protrusion 7 per round cell, but with three protrusions 7a which are uniformly distributed around the central protrusion 7 on the opposite side thereof with the same radial spacing, as also shown in FIG. 6 and not shown in FIG. 1. The respective three protrusions 7a per round cell minus pole protect the minus poles which are relatively soft in the centre from damage and can be impressed from the opposite side into the contact plates 2, while in the middle there still remains space between them to impress the protrusions 7, which contact the plus poles and protrude towards the protrusions 7a in the opposite direction. In this way, the three coaxial round cells are connected through in each case to form a round cell row in series connection.

In the exploded view of FIG. 5, the clamping means 5, 6 designed as pressure screws 5, 6 are only indicated. However, the battery cell module has a receptacle which has a base, as well as longitudinal and transverse walls. The pressure screws 5, 6 are screwed into threaded holes in the transverse walls and press on insulating plates, which in turn lie on the pole plates 3, 4 of the receptacle from the outside.

Figure 7:
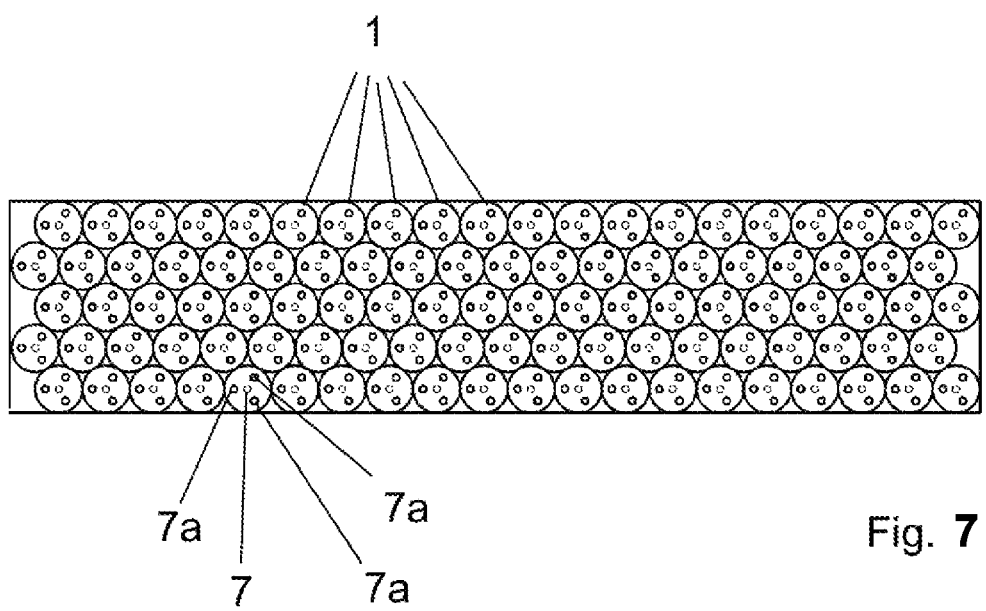
FIG. 7 shows the assignment of contact protrusions to round cells in a schematic diagram illustrating the battery module shown in FIG. 1.

FIG. 7 shows in a sketch-like manner how the contact protrusions 7 and 7a are arranged relative to each other and to the round cells 1. Although the number of round cells 1 per each round cell stack is markedly larger (20×5) than in FIG. 5 (2×10+1×9), the position of the three concentric protrusions 7a assigned to a round cell row relative to the respective central protrusion 7 arranged on the round cell row axis is clearly visible.

Figure 8:
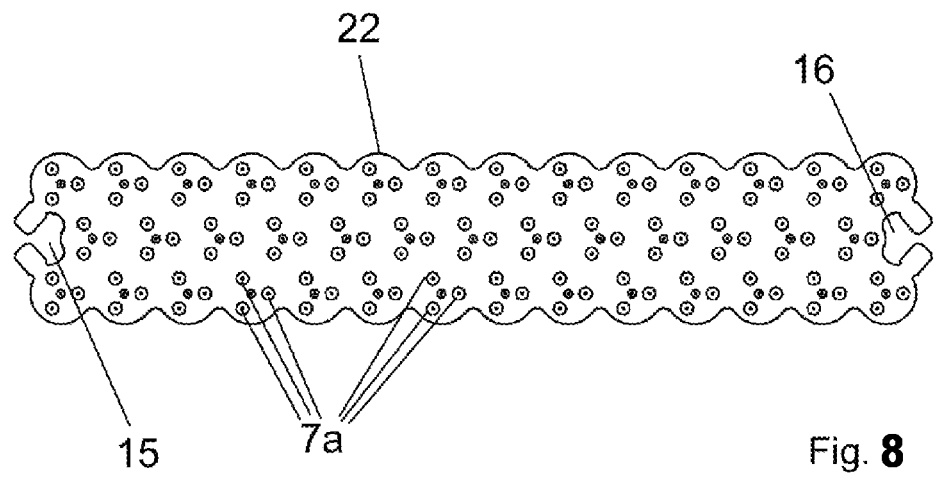
FIGS. 8 and 8a show a contact plate of a further embodiment of the invention, with tied rods guided through the battery module from both sides.

The further FIGS. 8, 8A, 9 and 10 show a contact plate 22 and the two end contact plates or end-side contact plates 22a, 22b of a battery module according to an alternative embodiment, which, as in the embodiment shown in the previous figure, are formed from copper sheet. FIG. 8 shows one of the contact plates 22 arranged between two of the round cell stacks, with its side facing the minus poles, i.e. with its side facing upwards in a representation corresponding to FIG. 5, and in FIG. 8A with its side facing downwards facing the plus poles.

Figure 8A:
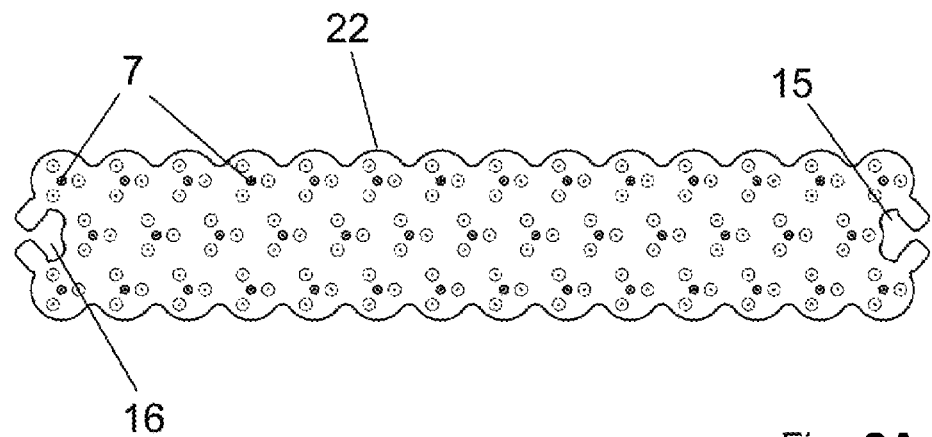

FIGS. 8 and 8A show the contact protrusions 7 which are impressed into the sheet metal and protrude on the round cell row axes as nubs towards the plus poles, as well as the contact protrusions 7a, which are also impressed into the sheet metal in the counter-direction around the protrusions 7 and face the minus poles. Both the central contact protrusions 7, as well as the contact protrusions 7a arranged concentrically therearound, can be seen in both views. In FIG. 8, the concentrically arranged contact protrusions 7a protrude from the sheet plane and the central contact protrusions are depressions embossed into the sheet plane. In FIG. 8A, on the other hand, the central contact protrusions protrude out of the sheet plane and the concentric protrusions protrude into the sheet plane.

Figure 9:
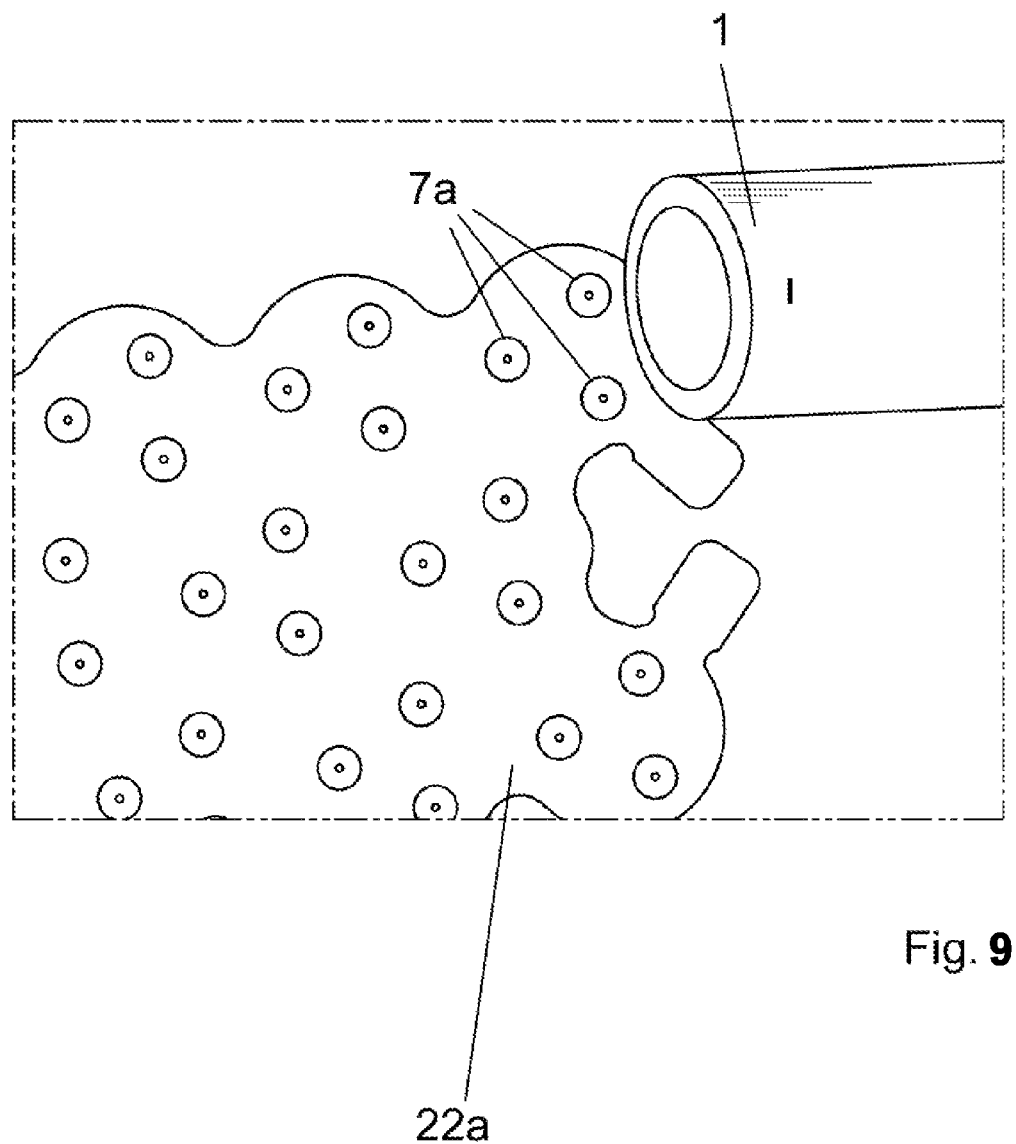
FIGS. 9 and 10 show both end contact plates of this embodiment of the invention with their respective sides facing an adjacent round cell stack and a round cell, which is shown only for illustration purposes.
Figure 10:
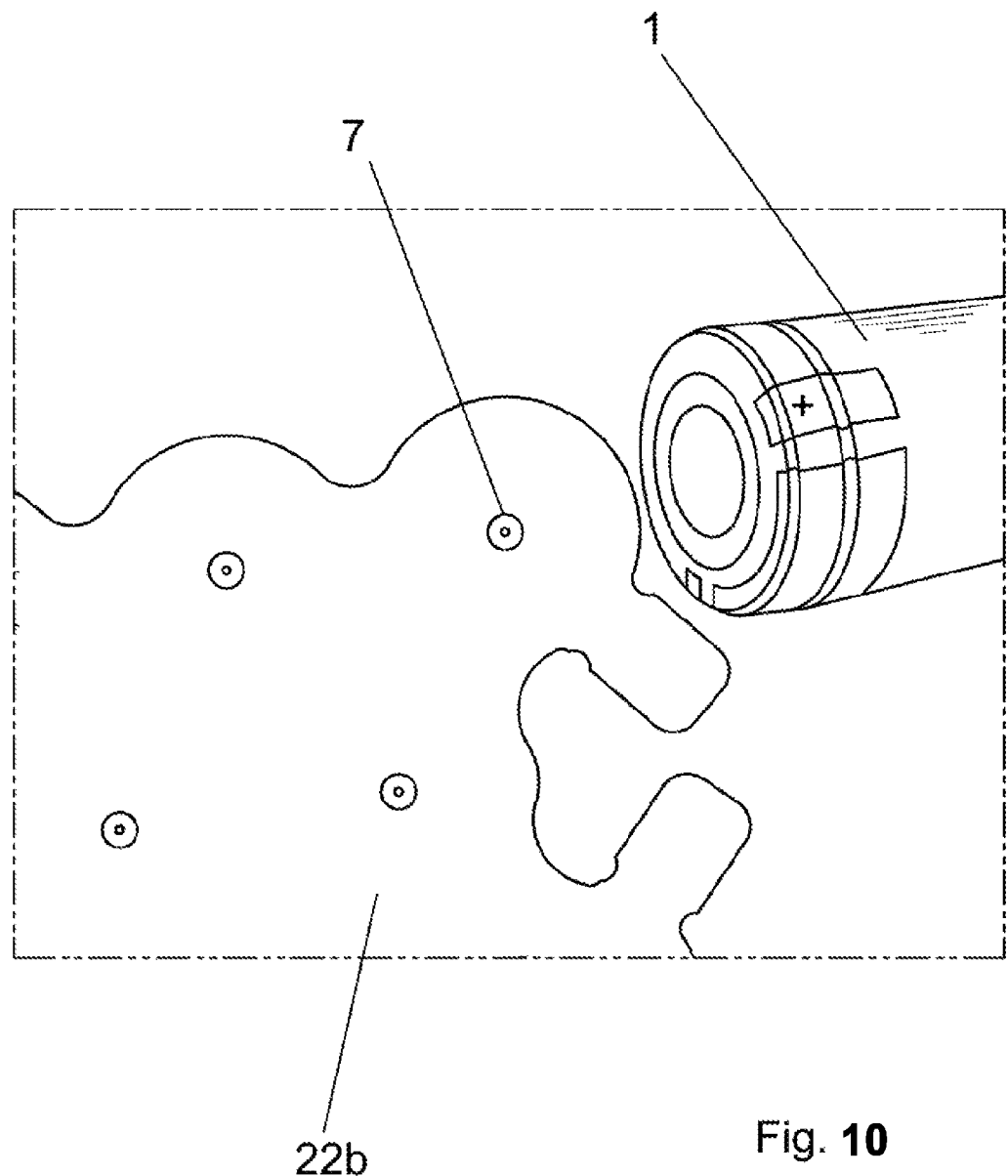

FIG. 9 shows the end contact plate 22 a, which is at the bottom in an illustration corresponding to FIG. 5 and faces the minus poles of the lowest round cell stack, into which only the concentric nubs 7a for contacting the minus poles are impressed. FIG. 6 shows a representation corresponding to FIG. 5 of the uppermost end contact plate 22b with its side facing the plus poles of the uppermost round cell stack, from which the central contact nubs 7 project out of the sheet plane. The contact plate 22 and the end contact plates 22a, 22b each have lateral recesses 15, 16 through which tie anchors can be guided to clamp the battery module according to this embodiment together.

Variations and modifications of the embodiments shown are possible without departing from the scope of the invention.

The invention claimed is:

1. A battery module, comprising a plurality of round cells of identical dimensions, target charge capacity and voltage, which are grouped into a series of round cell stacks, which round cell stacks are arranged one behind the other in a row and which round cell stacks all consist of an identical plurality of round cells which lie in each round cell stack axis-parallel to the stack row direction, adjacent and on top of each other in identical position in the stack row direction, wherein
   contact plates interposed between adjacent round cell stacks are provided, as well as end-side contact plates at the ends of the round cell stack row disposed in the stack row direction, which connect the round cells of each round cell stack in an electrically parallel manner at their poles disposed in the stack row direction, and wherein
   all the round cells are arranged in such a way that all identical electrical poles face in the same direction and form a plurality of aligned round cell rows corresponding to the plurality of round cells per round cell stack, the round cells of each round cell row are respectively electrically connected in series via the interposed contact plates, wherein
   at least the contact plates interposed between adjacent round cell stacks comprise protrusions for contacting the poles of the round cells and are electrically conductive at the protrusions and in the flat sections between the protrusions, wherein the protrusions press on the poles, but are not integrally connected to the poles, and wherein,
   at the two ends of the round cell stack row, a respective pole plate rests on the outside on the end-side contact plate there, which pole plates are thicker-walled as compared to the contact plates, and which form the ends of the round cell stack row forming the poles of the battery module, and wherein
   the protrusions have either identical dimensions and are provided on the contact plates at the positions corresponding to the axes of the round cell rows, wherein the protrusions each contact a pole of a round cell or both mutually facing poles of two adjoining round cells of a round cell row, so that all round cell poles are contacted via one of the protrusions,
   or
   the contact plates, which contact the plus poles of a round cell stack, comprise respective protrusions of identical dimensions on their sides facing the plus poles on the axes of the round cell rows, which protrusions each contact a plus pole of one of the round cells, and the contact plates, which contact the minus poles of a round cell stack, respectively comprise a plurality of protrusions with identical dimension on their sides facing the minus poles around the positions corresponding to the axes of the round cell regions, which protrusions each contact one of the minus poles of one of the round cells.

2. A battery module according to claim 1, wherein the protrusions have identical dimensions and are provided on the contact plates at the positions corresponding to the axes of the round cell rows, wherein the protrusions each contact one pole of a round cell, and wherein
   a pair of contact plates, which are in the form of sheet metal plates are interposed between the adjoining round cell stacks, wherein the protrusions are formed as nubs impressed into the contact plates.

3. A battery module according to claim 2, wherein also the two end-side contact plates are formed as sheet metal plates with impressed nubs, and wherein all of the contact plates are identical.

4. A battery module according to claim 3, wherein the contact plates interposed between the round cell stacks and the two end-side contact plates are formed as sheet copper plates.

5. A battery module according to claim 1, wherein the protrusions have identical dimensions and are provided on the contact plates at the positions corresponding to the axes of the round cell rows, wherein the protrusions each contact both mutually facing poles of two mutually adjoining round cells of a round cell row, and wherein a respective contact plate formed as a printed circuit board or a pair of contact plates formed as printed circuit boards is or are interposed between adjoining round cell stacks, and also the end-side contact plates, which are provided at the ends of the round cell stack row disposed in the stack row direction, are formed as printed circuit boards, wherein the contact plates comprise through-bores at the positions corresponding to the axes of the round cell rows, and wherein the protrusions are formed as sleeves or bolts, consisting of copper, and are inserted into the through-bores, or as solder points placed there, wherein each of the protrusions of a contact plate is connected in parallel to each other protrusion of the contact plate via conductor tracks on the respective contact plate, and wherein all of the contact plates are identical.

6. A battery module according to claim 1, wherein the contact plates contacting the plus poles of one of the round cell stacks have protrusions of identical dimensions on their sides facing the plus poles on the axes of the round cell rows, which each contact a plus pole of a round cell, and the contact plates contacting the minus poles of one of the round cell stacks comprise a plurality of protrusions of identical dimensions on their sides facing the minus poles around positions corresponding to the axes of the round cell regions, which each contact one of the minus poles of a round cell, wherein a respective contact plate, which is formed as a sheet metal plate, is interposed between adjoining round cell stacks, and at the ends of the round cell stack row situated in the stack row direction an end-side contact plate is provided, respectively, which is formed as a sheet metal plate, wherein the protrusions are formed as nubs impressed into the contact plates, wherein also the two end-side contact plates are formed with impressed nubs.

7. A battery module according to claim 6, wherein the protrusions of each of a plurality of protrusions assigned to a minus pole are distributed concentrically and circumferentially uniformly around the associated axis of the respective round cell row.

8. A battery module according to claim 7, wherein the contact plates interposed between the adjacent round cell stacks each have the central protrusions on their sides facing the plus poles of the one round cell stack, and on their sides assigned to the minus poles of the other round cell stack the pluralities of protrusions arranged around the axis of the round cell rows.

9. A battery module according to claim 8, wherein each of a plurality of protrusions assigned to a minus pole consists of three protrusions.

10. A battery module according to claim 8, wherein all of the contact plates interposed between the round cell stacks are identical.

11. A battery module according to claim 10, wherein each of the contact plates
interposed between the round cell stacks and each of the end-side contact plates are formed as a sheet copper plate.

12. A battery module according to claim 6, wherein each of the end-side contact plates comprises either the central protrusions or the pluralities of protrusions, only.

13. A battery module according to claim 1, wherein the batter module comprises at least one clamping means acting on one of the two ends of the round cell stack row in order to exert a clamping force acting in the stack row direction on the round cell stack row, wherein the clamping means act on the pole plates.

14. A battery module according to claim 13, wherein the contact plates, the end contact plates and the pole plates have recesses through which tie rods are guided, which exert the clamping force on the round cell stack row with the clamping means formed as nuts.

15. A battery module according to claim 1, wherein the round cells are arranged in groups in a receptacle adapted to form the row of round cell stacks.

16. A battery module according to claim 15, wherein the receptacle has a base and two longitudinal flanks which are fixedly connected thereto and extend longitudinally along the base and upwards, wherein the receptacle has, at the ends of the two longitudinal flanks, transverse walls, on which the clamping means are supported which press from the outside against one or both ends of the round cell stack row, wherein the pole plate there is movably accommodated in the receptacle in the stack row direction.

17. A battery module according to claim 16, wherein a detachable cover adapted to the receptacle is provided, which forms, together with the receptacle, a housing which is closed at least at the base, top and longitudinal sides, from which connecting lines that are electrically connected to the pole plates are guided to the outside or which has connections which are electrically connected to the pole plates.

18. A battery module according to claim 15, wherein the round cell stacks comprise layers of round cells which are stacked on top of each other, wherein the round cells of each of these round cell layers lie directly on the round cells of the respective round cell layer located underneath.

19. A battery module according to claim 1, wherein the contact plates interposed between the round cell stacks are inserted loosely between the round cell stacks.

20. A battery module according to claim 19, wherein also the end-side contact plates are inserted loosely into the receptacle.

* * * * *